(12) United States Patent
Nakamura et al.

(10) Patent No.: US 6,529,714 B1
(45) Date of Patent: Mar. 4, 2003

(54) RADIO COMMUNICATION EQUIPMENT

(75) Inventors: Yutaka Nakamura; Noboru Koike, both of Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/314,148

(22) Filed: May 19, 1999

(30) Foreign Application Priority Data

May 20, 1998 (JP) ............................................. 10-138668

(51) Int. Cl.[7] ................................................. H04B 1/38
(52) U.S. Cl. .......................... 455/90; 455/347; 455/573; 320/112; 429/97; 439/500
(58) Field of Search .......................... 455/90, 550, 128, 455/347, 348, 351, 573; 439/500; 429/97, 123; 320/111, 112

(56) References Cited

U.S. PATENT DOCUMENTS 5,317,247 A * 5/1994 Chong et al. ................. 455/90
5,787,361 A * 7/1998 Chen ........................... 455/550
5,808,289 A * 9/1998 Becker ......................... 235/472

FOREIGN PATENT DOCUMENTS

| JP | 4-126682 | 11/1992 |
|---|---|---|
| JP | 06-089709 | 3/1994 |
| JP | 6-29056 | 4/1994 |
| JP | 06-60052 | 8/1994 |
| JP | 08-279945 | 10/1996 |
| JP | 09-055785 | 2/1997 |

* cited by examiner

Primary Examiner—Lee Nguyen
(74) Attorney, Agent, or Firm—Finnegan, Henderson, Farabow, Garrett & Dunner, L.L.P.

(57) ABSTRACT

A radio communication equipment including a housing and a battery pack to be attached to said housing, said radio communication equipment having a male connector of a floating connector provided on said housing, and a female connector the floating connector provided on said battery pack to engage with said male connector.

54 Claims, 10 Drawing Sheets

FIG. 4
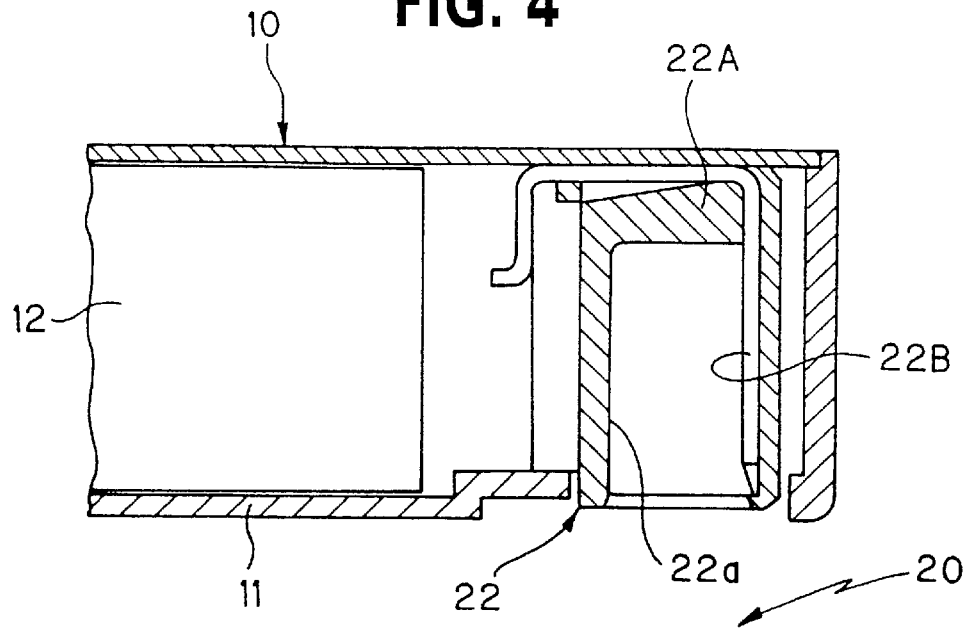
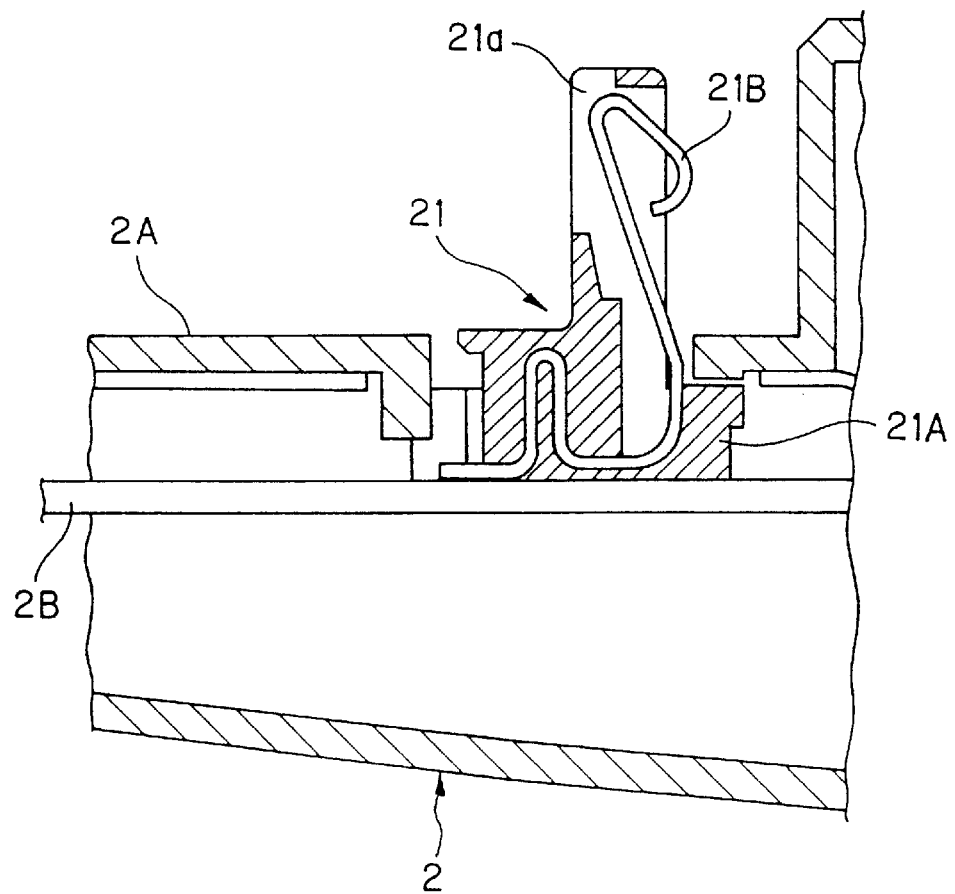

RADIO COMMUNICATION EQUIPMENT

BACKGROUND OF THE INVENTION

1. Field of the Invention

The present invention relates to a radio communication equipment and more particularly to the structure of electrical connection between a housing of a radio communication equipment and a battery pack.

2. Description of the Related Art

The mainstream electrical connection between a telephone housing B and a battery pack C in a portable telephone (radio communication equipment) A comprising the battery pack C which is attached to the telephone housing B has been configured so that spring pins b provided in the telephone housing B contact face-to-face with terminals c provided in the battery pack C as shown in FIGS. 7 through 9.

However, the structure of contacting the spring pins b with the terminals c face-to-face has had a problem that because the position of the contact part of the spring pins b and terminals c is precisely defined in the state when the battery pack C is attached to the telephone housing B, there has been a case when the spring pins b separate from the terminals c instantaneously, i.e., when a so-called instantaneous disconnection occurs, thus disconnecting the electrical connection, when an impact is given on the telephone housing B or the battery pack C.

Meanwhile, a personal handy phone (PHS) H shown in FIG. 10 comprises a housing I, a lid J and a battery pack K. The housing I is electrically connected with the battery pack K by engaging a connector k provided to the battery pack K via a harness h to a connector i provided in the housing I. Such structure causes no instantaneous disconnection as described above.

It is then conceivable to apply the structure of connection of the housing I and the battery pack K in the personal handy phone H described above to the structure of connection of the housing and the battery pack of the portable telephone.

However, although it is required to often replace the battery pack of the digital portable telephone for example in case of using it for business purposes because its continuous speakable time is around 120 minutes, the structure of connection of the personal handy phone cannot be adopted for that of the portable telephone from the aspect of its durability because the connectors i and k of the personal handy phone H are not designed to be used in the environment in which they are removed frequently and a durable removable number of times is only around 30 times.

Still more, because the connector k is attached to the harness h extending from the battery pack K in the personal handy phone H described above, there has been a possibility that not only the work for removing the connector k from the connector i of the housing I is complicated but also the harness h is unintentionally damaged and disconnected in carrying the battery pack K.

Accordingly, in view of the problems described above, it is an object of the invention to provide a radio communication equipment which is capable of preventing the instantaneous disconnection of the electrical connection between the housing and the battery pack in advance without leading to a drop of the durability and workability.

SUMMARY OF THE INVENTION

Accordingly, the present invention has been made in view of the above circumstances and has an object to provide a radio communication equipment capable of preventing the instantaneous disconnection of the electrical connection between the equipment and the battery pack because the floating connector absorbs relative move of the housing and the battery pack when vibration is applied from the outside by connecting the housing with the battery pack via the floating connector.

The object and advantage of the invention, there is provided a radio communication equipment including a housing and a battery pack to be attached to said housing, said radio communication equipment having a male connector of a floating connector provided on said equipment, and a female connector the floating connector provided on said battery pack to engage with said male connector.

Further, there is provided a battery pack for use in an equipment enclosed in a housing, the equipment including a male connector of a floating connector, the battery pack having a female connector which is to be engaged with a male connector.

BRIEF DESCRIPTION OF THE DRAWINGS

FIG. 4 is a section view showing the main part of the floating connector of the inventive radio communication equipment;

DESCRIPTION OF THE PREFERRED EMBODIMENT

The present invention will be explained below based on the drawings showing one embodiment thereof.

Figure 1:
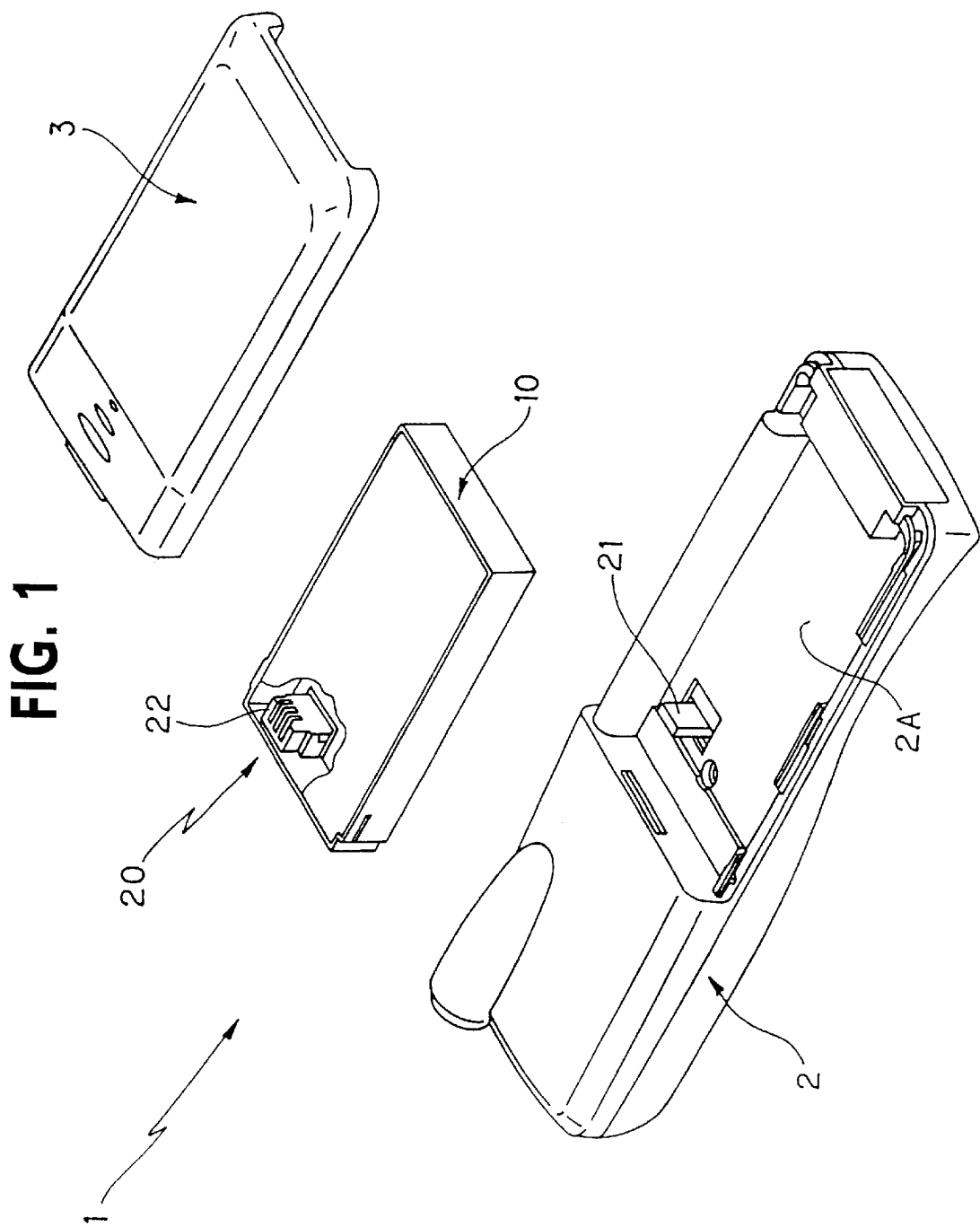
FIG. 1 is an exploded perspective view showing a radio communication equipment (portable telephone) according to a first embodiment of the invention.
Figure 2:
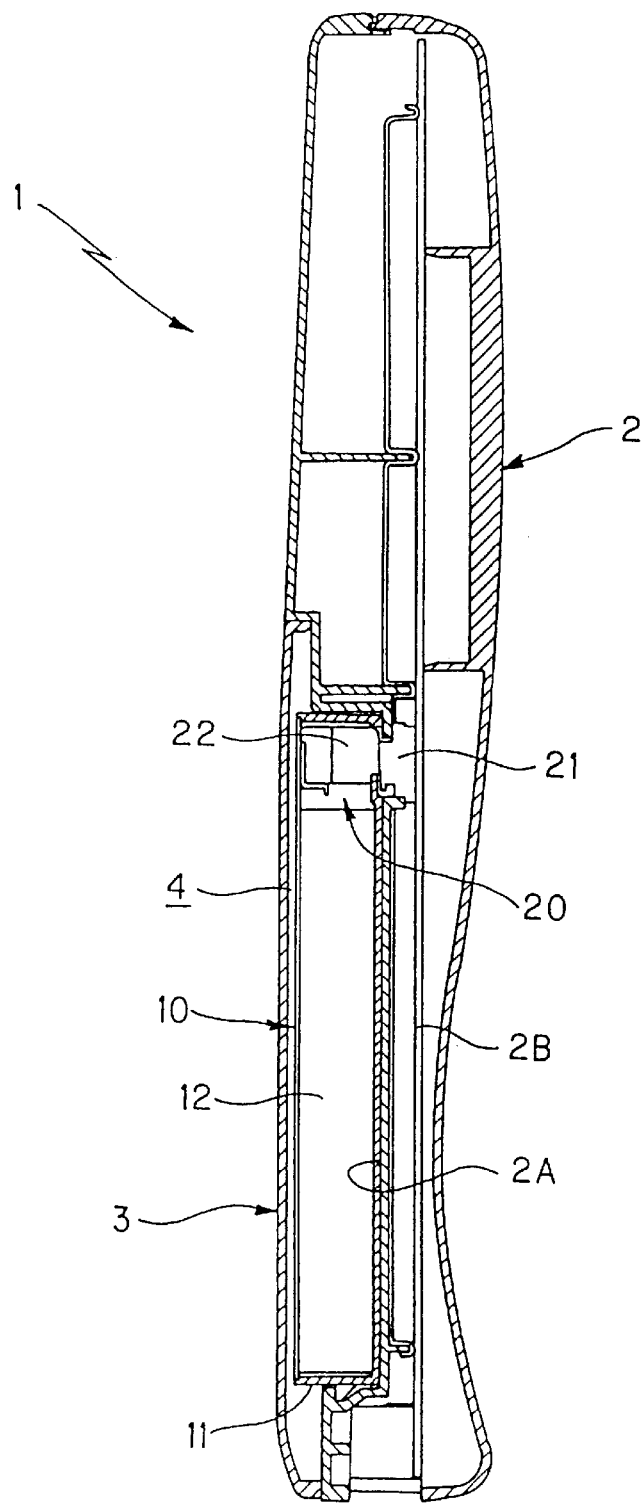
FIG. 2 is a section view showing the radio communication equipment of the invention.

FIGS. 1 through 5 show a portable telephone 1 as a radio communication equipment to which the invention is applied. As shown in FIGS. 1 and 2, the portable telephone 1 comprises a telephone housing (housing of the communication equipment) 2, a lid 3 and a battery pack 10.

The telephone housing 2 is provided with control buttons and others not shown on the front side (on the right side in FIG. 2) and a battery storing recess 2A on the back side (on the left side in FIG. 2). A battery compartment 4 is comparted by the lid 3 which is attached to the telephone housing 2 so as to cover the battery storing recess 2A and the battery pack 10 is stored in the battery compartment 4.

A male connector (one connector) 21 composing a floating connector 20 described later for electrically connecting the telephone housing 2 with the battery pack 10 is fixedly provided on a circuit board 2B so as to protrude to the battery storing recess 2A in the telephone housing 2.

Meanwhile, the battery pack 10 contains a battery cell 12 within a casing 11 thereof and a female connector (the other connector) 22 composing the floating connector 20 is fixedly provided within the casing 11 so as not protrude out of the casing 11 in the battery pack 10.

Figure 3:
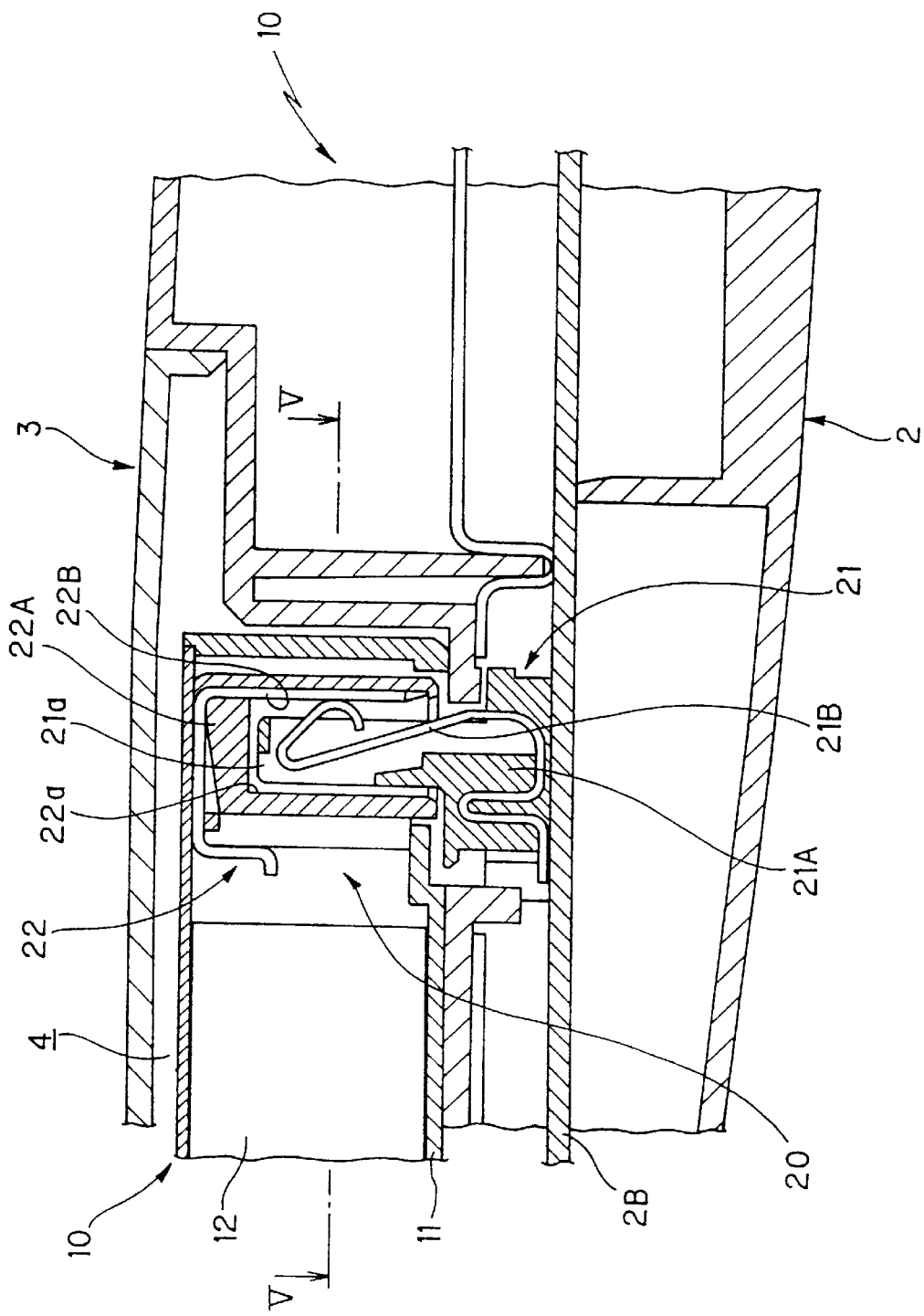
FIG. 3 is a section view showing the main part of a floating connector of the inventive radio communication equipment.
Figure 5:
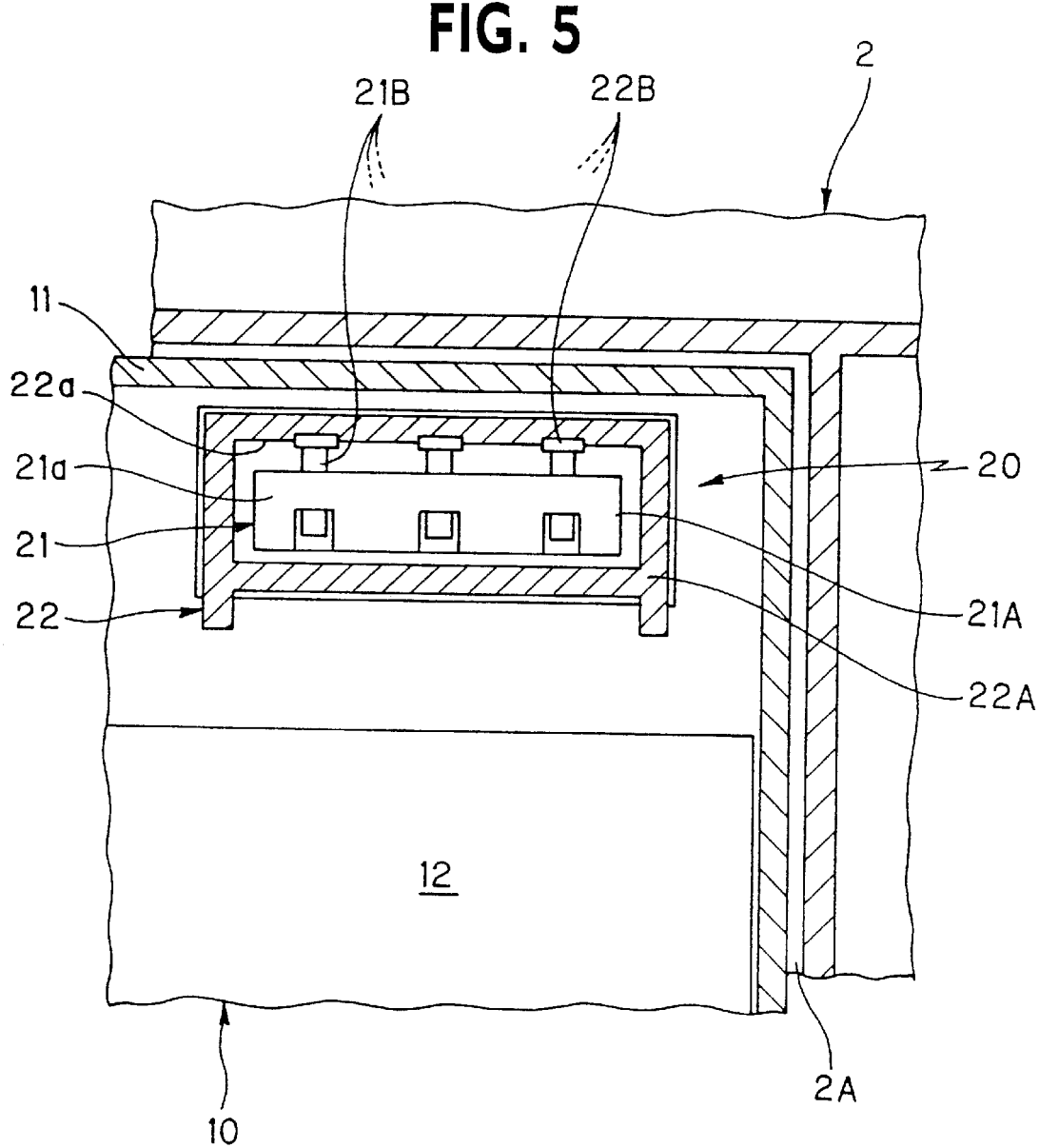
FIG. 5 is a section view taken along a line V—V in FIG. 3.

As shown in FIGS. 3 through 5, the male connector 21 of the floating connector 20 has a connector block 21A having a convex portion 21a and cantilever type contacts 21B which extend along the convex portion 21a and the convex portion 21a of the connector block 21A is provided so as to protrude to the back side (upper side in FIGS. 3 and 4) of the telephone housing 2.

Meanwhile, the female connector 22 of the floating connector 20 has a connector block 22A having a concave portion 22a and contacts 22B provided so as to face to the concave portion 22a and the concave portion 22a of the connector block 22A is provided so as to face to the convex portion 21a of the male connector 21 provided on the telephone housing 2.

In the portable telephone 1 constructed as described above, the battery pack 10 is mounted by storing the battery pack 10 in the battery storing recess 2A from the back of the telephone housing 2 while engaging the male connector 21 with the female connector 22 in the telephone housing 2 from which the lid 3 is removed and then by attaching the lid 3 to the telephone housing 2.

Here, the telephone housing 2 is connected electrically with the battery pack 10 when the contact 21B of the male connector 21 press-contacts the contact 22B of the female connector 22 by its elastic force when the male connector 21 is engaged with the female connector 22 in the floating connector 20 as shown in FIGS. 3 and 5.

Further, a clearance is created, though it is very small (about ±0.5 mm), between the convex portion 21a of the connector block 21A of the male connector 21 and the concave portion 22a of the connector block 22A of the female connector 22 in the state when the male connector 21 is engaged with the female connector 22 so that the male connector 21 and the female connector 22 can move relatively in the three directions of in front and in rear, right and left and up and down and so that the contact 21B of the male connector 21 abuts always with the contact 22B of the female connector 22.

Therefore, when vibration is applied from the outside, the relative move of the telephone housing 2 and the battery pack 10 is absorbed in the floating connector 20 in the portable telephone 1 constructed as described above, so that it is possible to prevent the instantaneous disconnection of the electrical connection between the telephone housing 2 and the battery pack 10 caused by the vibration.

Further, because the telephone housing 2 is connected electrically with the battery pack 10 in the portable telephone 1 constructed as described above by using the floating connector 20, which is far more durable than the connector used in the personal handy phone, there will be no problem in terms of the durability of the floating connector 20 even when the portable telephone 1 is used by replacing the battery pack 10 frequently.

Still more, because the female connector 22 is fixedly provided to the casing 11 of the battery pack 10 in the portable telephone 1 constructed as described above, the work for connecting/disconnecting the male connector 21 to/from the female connector 22, i.e., the work for attaching/ removing the battery pack 10 to/from the telephone housing 2, may be facilitated as compared to the prior art structure in which the connector is attached to the battery pack via the harness.

Moreover, because the female connector 22 is not protruding out of the casing 11 of the battery pack 10 in the portable telephone 1 constructed as described above, it is not only easy to carry the battery pack 10 but is also possible to prevent the problem of unintentional disconnection of the wire connecting the battery cell 12 with the female connector 22 from occurring.

Still more, because the lid 3 which composes the appearance together with the telephone housing 2 is constructed separately from the battery pack 10 in the portable telephone 1 constructed as described above, it is not necessary to change the specification of the battery pack 10 and hence is possible to standardize the battery pack 10 even when the design thereof such as color variation of the appearance is different.

Figure 6:
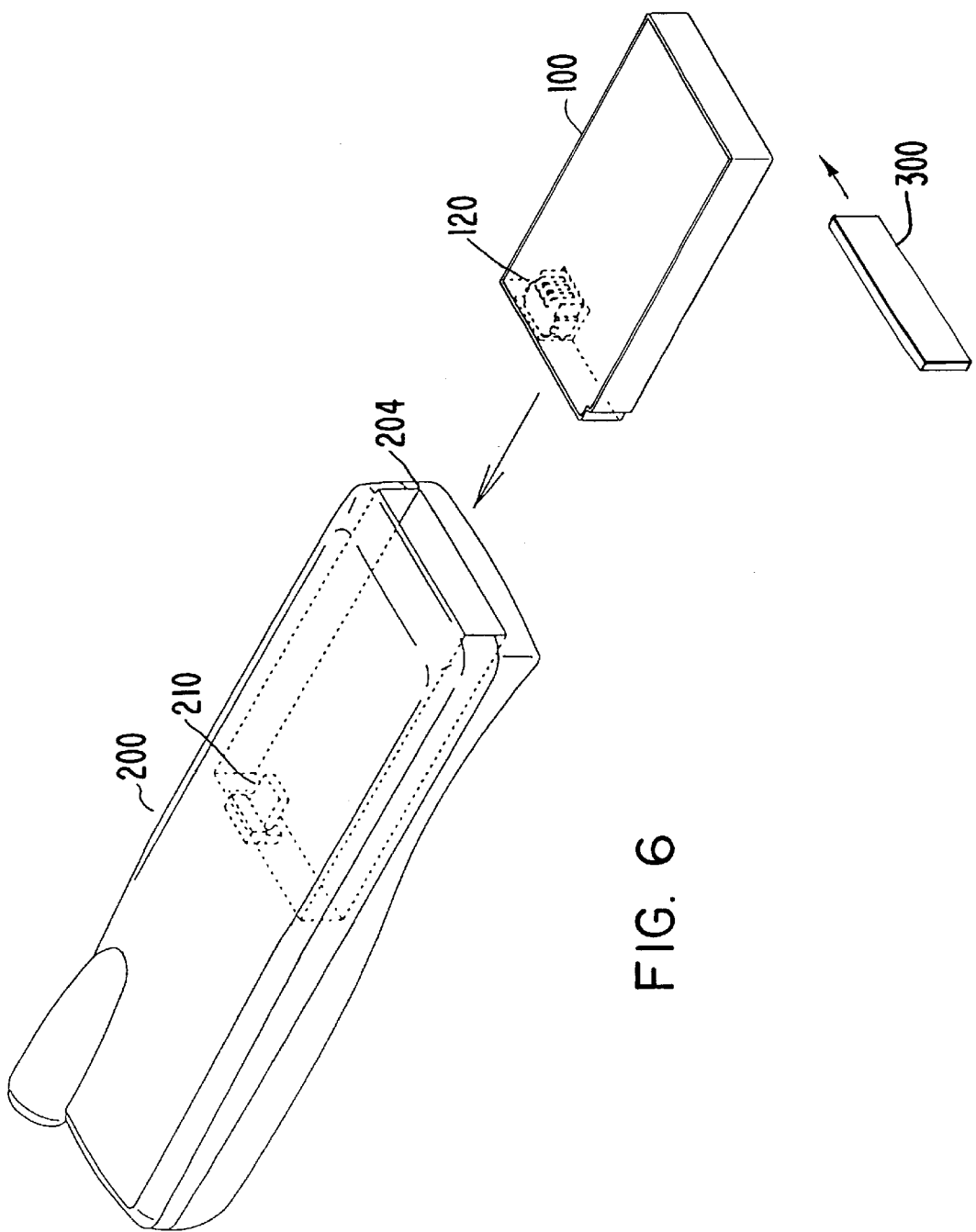
FIG. 6 is a perspective view showing a radio communication equipment according to a second embodiment of the invention.
Figure 7:
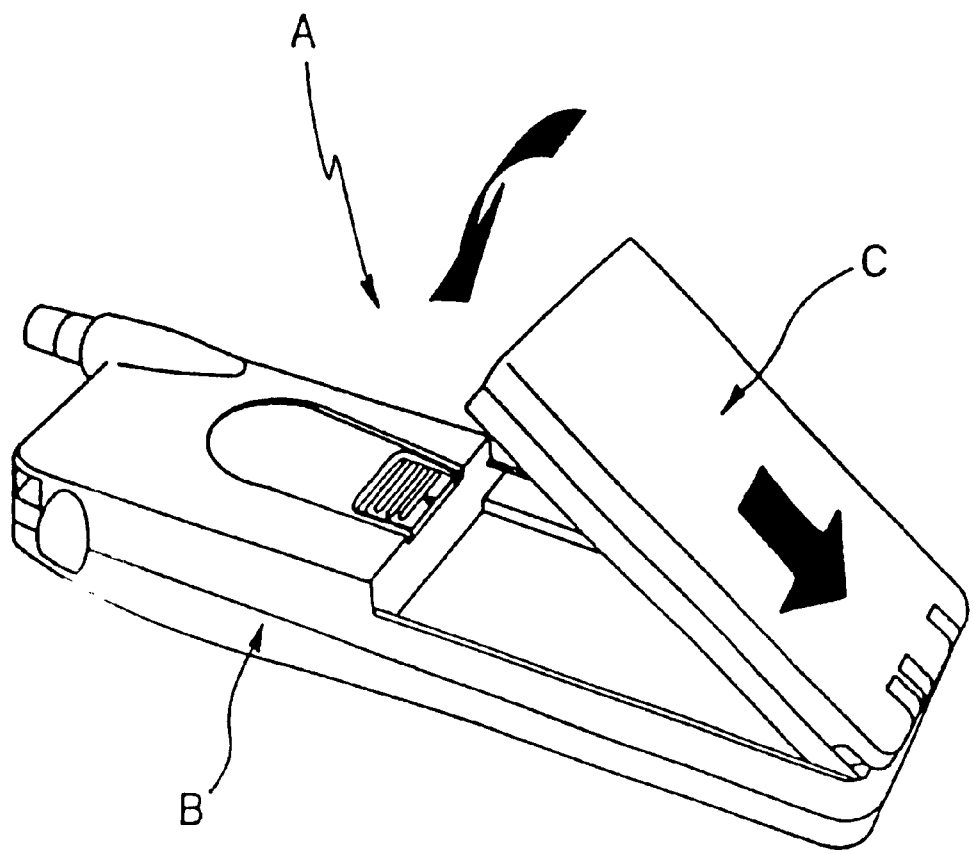
FIG. 7 is a perspective view of an appearance of a prior art radio communication equipment.
Figure 8:
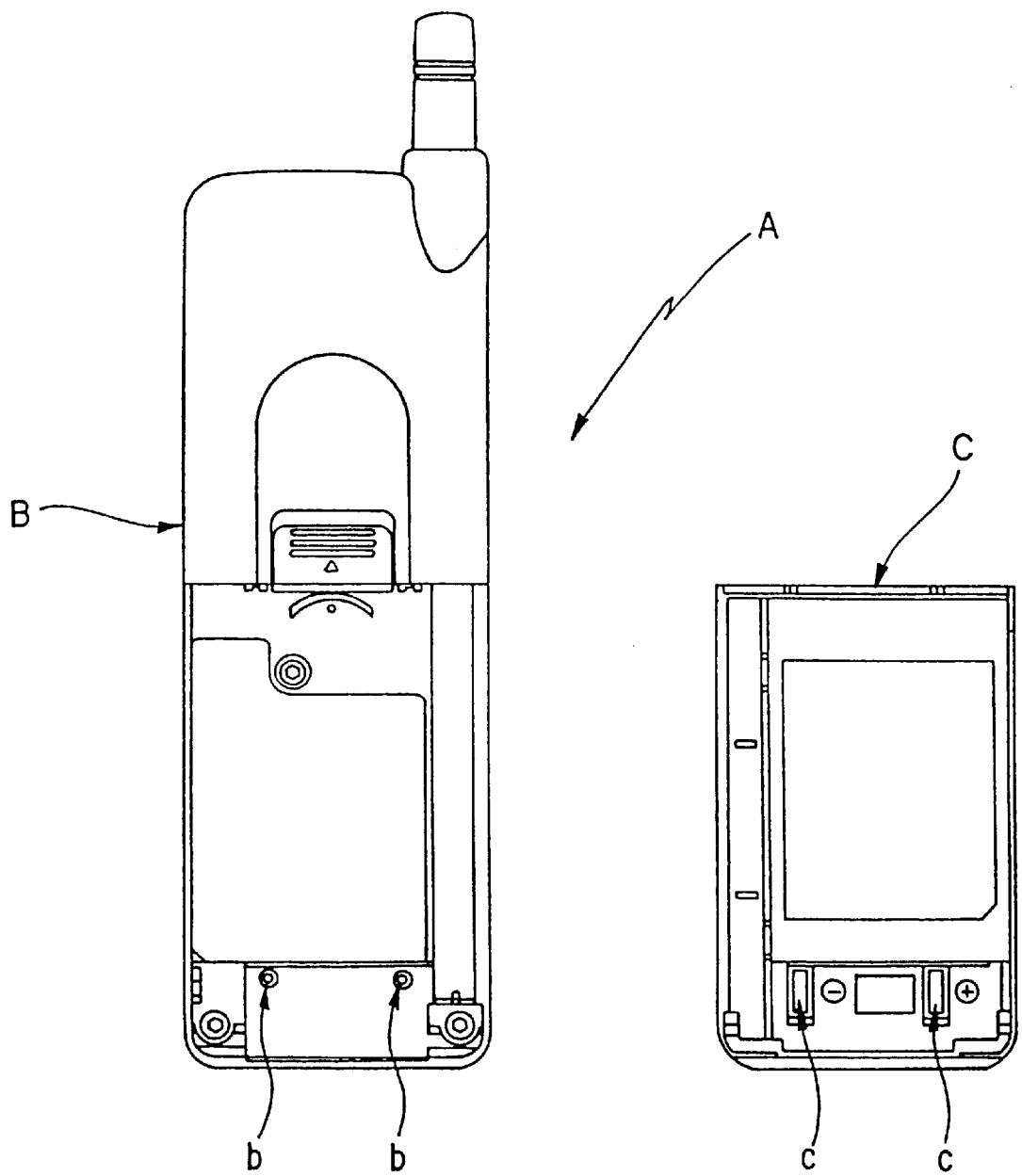
FIG. 8 is an appearance of a housing and a battery pack of the prior art radio communication equipment.
Figure 9:
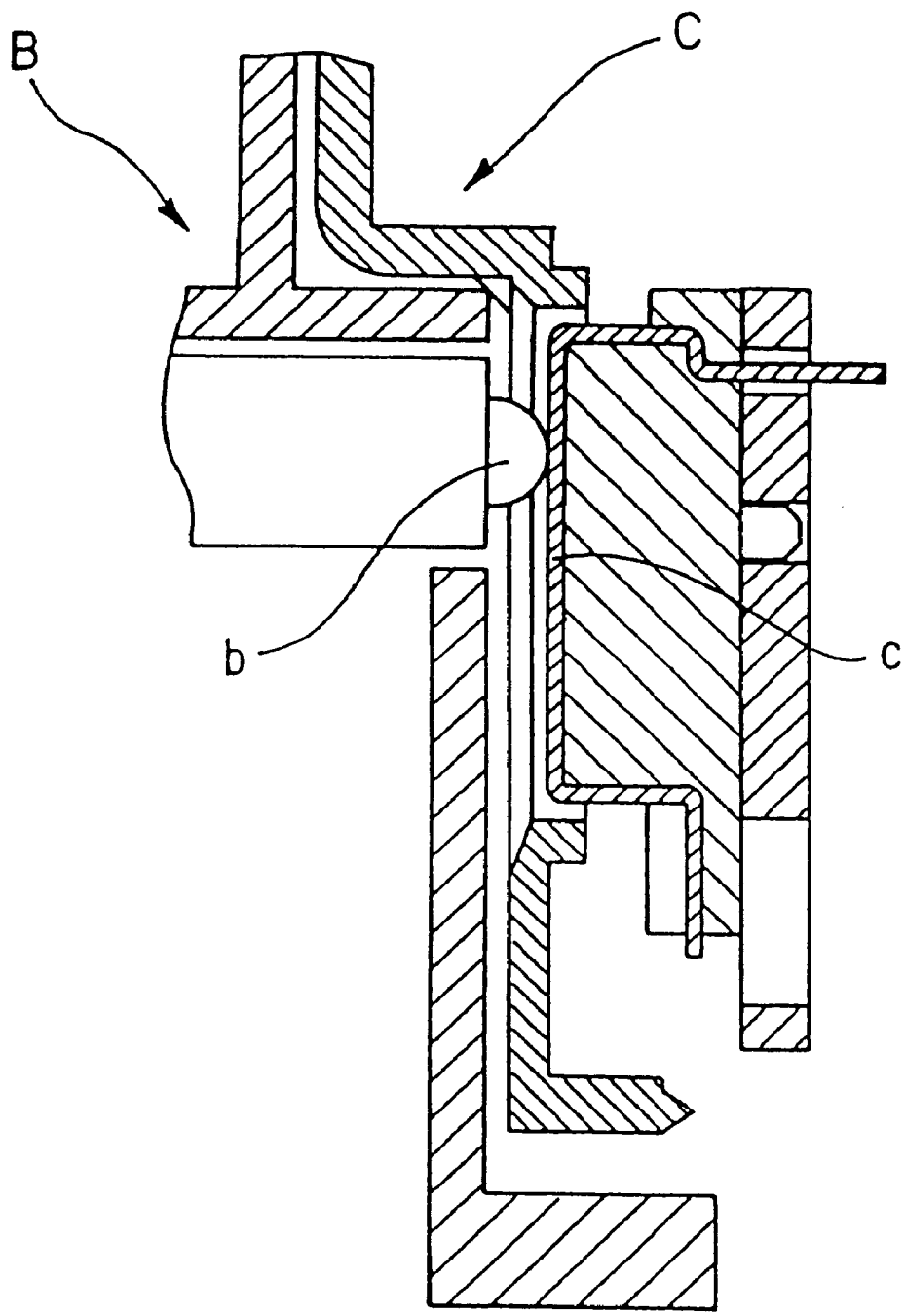
FIG. 9 is a section view showing the main part of spring pins and terminals of the prior art radio communication equipment.
Figure 10:
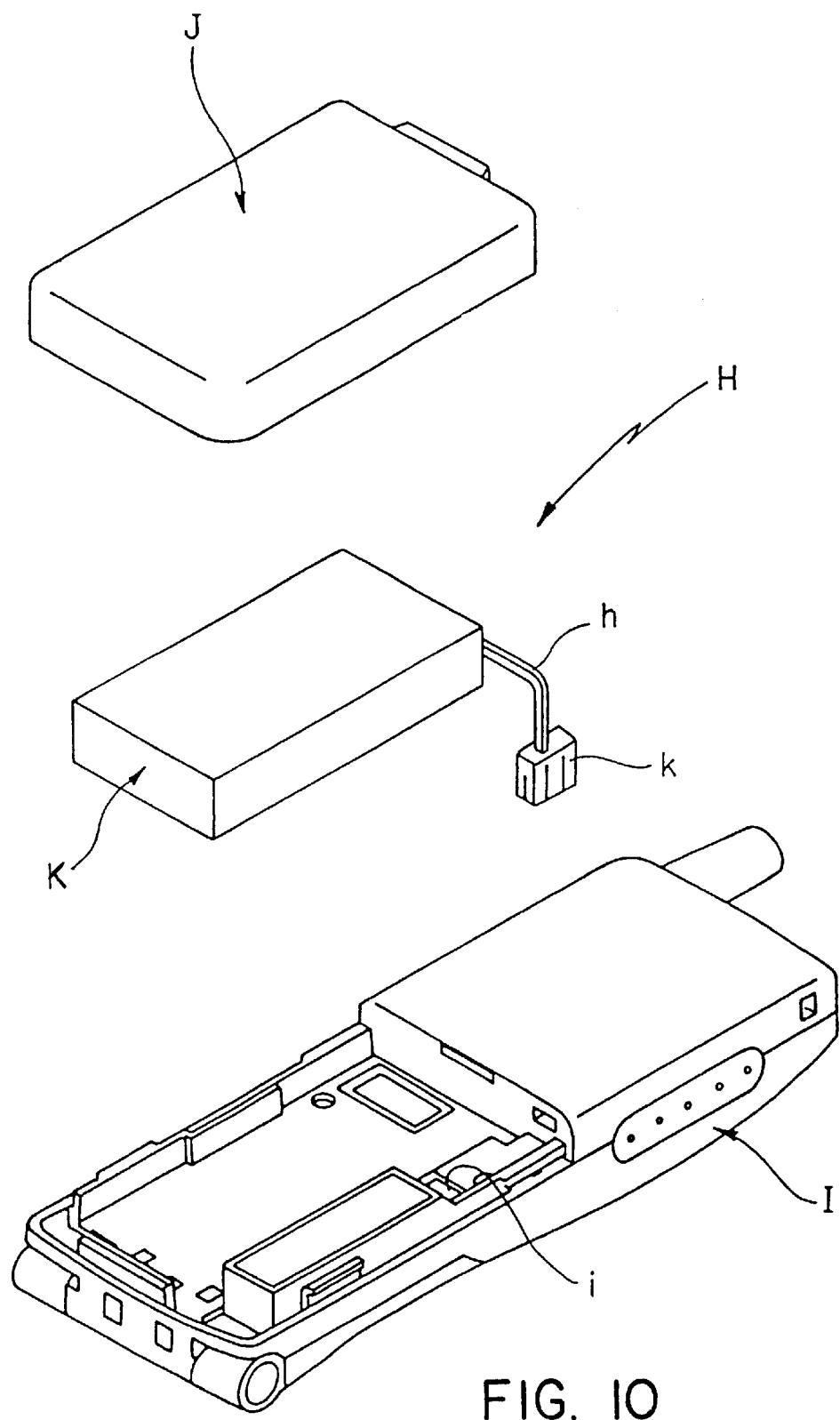
FIG. 10 is an exploded perspective view showing another prior art radio communication equipment.

It is noted as for the mode of connection of the housing and the battery pack that an opening 204 leading to the battery storing recess may be created at the end face of a housing 200 of the portable telephone so that a battery pack 100 can be inserted from the end face as shown in FIG. 6 as another embodiment.

A male connector 210 which is the same with the male connector of the floating connector used in the first embodiment is provided in the battery storing recess so as to extend in parallel with the longitudinal direction of the telephone housing. Meanwhile, a female connector 120 which is to be connected with the male connector 210 is provided at the end face of the battery pack 100 as shown in the figure.

Thereby, the male and female connectors 210 and 120 of the floating connector engage by inserting the battery pack 100 to the housing 200 in the direction shown in the figure. Then, the battery pack may be connected with the telephone housing via the floating connector so that the battery pack will not be separated from the telephone housing by attaching a lid 300 to the housing 200 so as to close the opening 204 of the housing 200.

It is noted that although the portable telephone has been illustrated in the embodiments described above, it is needless to say that the invention may be effectively applied not only to the portable telephone but also to various radio communication equipments.

As described in detail above, according to the inventive radio communication equipment which is configured so as to store the battery pack in the battery compartment comparted by attaching the lid on the housing, one connector composing the floating connector is fixedly provided in the housing and the other connector composing the floating connector is fixedly provided in the battery pack and one connector is engaged with the other connector to electrically connect the housing with the battery pack.

It is possible to prevent the instantaneous disconnection of the electrical connection between the housing and the battery pack because the floating connector absorbs relative move of the housing and the battery pack when vibration is applied from the outside by connecting the housing with the battery pack via the floating connector.

Further, the floating connector will cause no problem in terms of its durability even when the radio communication equipment is used by replacing the battery pack frequently because the floating connector which is far durable than the connector used in the personal handy phone is used.

Still more, the work for connecting/disconnecting the connectors, i.e., the work for attaching/removing the battery pack to/from the housing, may be facilitated as compared to the configuration in which the connector is attached to the battery pack via the harness because the other connector is fixedly provided on the battery pack.

Accordingly, the inventive radio communication equipment is capable of preventing the instantaneous disconnection of the electrical connection between the housing and the battery pack without dropping the durability and workability.

What is claimed is:

1. A radio communication device comprising:
   a housing defining a battery storage recess and configured to store radio communication equipment;
   a casing shaped to store a battery cell and configured to fit in the battery storage recess of the housing;
   a first connector supported by the casing and shaped to define a concave portion, the first connector having a contact electrically connected to the battery cell;
   a second connector shaped to define a convex portion protruding away from the housing so as to fit within the concave portion of the first connector, the second connector having a contact electrically connected to the radio communication equipment stored in the housing, the contact of the second connector configured to be electrically connected to the contact of the first connector; and
   wherein the contact of the second connector is arranged to selectively move relative to the housing and bias against the contact of the first connector when the convex portion of the second connector is fitted within the concave portion of the first connector and while the casing selectively moves relative to the housing.

2. The device of claim 1, wherein the convex portion of the second connector is configured to protrude away from an inner wall of the battery storage recess of the housing.

3. The device of claim 1, further comprising a lid shaped to cover the casing and be attached to the housing.

4. The device of claim 3, wherein the lid is shaped to fit around different casings.

5. The device of claim 1, wherein the first connector comprises a female connector and the second connector comprises a male connector.

6. The device of claim 1, wherein the contact of the second connector is configured to move relative to the housing while maintaining an electrical connection with the contact of the first connector.

7. The device of claim 1, wherein the second connector protrudes away from the housing along a direction substantially perpendicular to a longitudinal direction of the housing.

8. The device of claim 7, wherein the contact of the second connector is configured to move along a direction substantially parallel to the longitudinal direction of the housing.

9. The device of claim 7, wherein a central axis of the concave portion of the first connector extends along a direction substantially perpendicular to a longitudinal direction of the casing.

10. The device of claim 1, wherein the second connector protrudes away from the housing along a direction substantially parallel to a longitudinal direction of the housing.

11. The device of claim 10, wherein the contact of the second connector is configured to move along a direction substantially perpendicular to the longitudinal direction of the housing.

12. The device of claim 10, wherein a central axis of the concave portion of the first connector extends along a direction substantially parallel to a longitudinal direction of the casing.

13. The device of claim 1, wherein the contact of the second connector comprises a cantilever member configured to move relative to a pivot point.

14. The device of claim 13, wherein the second connector comprises a connector block supported by the housing and the cantilever member is configured to move relative to the connector block.

15. The device of claim 14, wherein the first connector comprises a connector block defining a first wall of the concave portion, and the contact of the first connector defines a second wall of the concave portion.

16. A battery device for use with an electrical circuit comprising:
    a housing having a recess and arranged to support the electrical circuit;
    a casing configured to support a battery cell and be inserted into the recess of the housing;
    a first connector supported by the casing and arranged to define a groove, the first connector having a contact element extending inside the groove and electrically connected to the battery cell;
    a second connector supported by the housing and arranged to protrude within the groove defined by the first connector when the casing is inserted into the recess of the housing, the second connector having a contact element electrically connected to the electrical circuit supported by the housing, the contact element of the second connector being arranged to be electrically connected to the contact element of the first connector; and
    wherein the contact of the second connector moves relative to the housing and biases against the contact element of the first connector when the casing is inserted into the recess of the housing and while the casing selectively moves relative to the housing.

17. The device of claim 16, wherein the second connector protrudes away from an inner wall of the battery storage recess of the housing.

18. The device of claim 16, further comprises a lid shaped to cover the casing and be attached to the housing.

19. The device of claim 16, wherein the first connector comprises a female connector and the second connector comprises a male connector.

20. The device of claim 16, wherein the contact element of the second connector is configured to move relative to the housing while maintaining an electrical connection with the contact element of the first connector and the electrical circuit supported by the housing.

21. The device of claim 16, wherein the second connector protrudes away from the housing along a direction substantially perpendicular to a longitudinal direction of the housing, and the contact element of the second connector is configured to move along a direction substantially parallel to the longitudinal direction of the housing.

22. The device of claim 21, wherein a central axis of the groove defined by the first connector extends along a direction substantially perpendicular to a longitudinal direction of the casing.

23. The device of claim 16, wherein the second connector protrudes away from the housing along a direction substantially parallel to a longitudinal direction of the housing, and the contact element of the second connector is configured to move along a direction substantially perpendicular to the longitudinal direction of the housing.

24. The device of claim 23, wherein a central axis of the groove defined by the first connector extends along a direction substantially parallel to a longitudinal direction of the casing.

25. The device of claim 16, wherein the contact of the second connector comprises a cantilever member configured to move relative to a pivot point.

26. The device of claim 25, wherein the second connector comprises a connector block supported by the housing and the cantilever member is configured to move relative to the connector block.

27. The device of claim 26, wherein the first connector comprises a connector block defining a first wall of the groove, and the contact element of the first connector defines a second wall of the groove.

28. A device for electrically connecting a battery to a circuit board comprising:

a housing arranged to support the circuit board;

a casing configured to support the battery and be connected to the housing;

a female connector having a connector block supported by the casing and defining a groove portion, and a contact electrically connected to the battery;

a male connector having a connector block supported by the housing and shaped to protrude away from the housing and fit within the groove portion defined by the connector block of the female connector when the casing is connected to the housing, the male connector having a contact electrically connected to the circuit board supported by the housing, the contact of the male connector arranged to be electrically connected to the contact of the female connector; and wherein the contact of the male connector moves relative to the housing and is biased against the contact of female connector when the casing is connected to the housing and while the casing selectively moves relative to the housing.

29. The device of claim 28, wherein the housing is shaped to define a casing storage recess and the casing is shaped to fit within the casing storage recess when the casing is connected to the housing.

30. The device of claim 28, wherein the connector block of the male connector protrudes away from an inner wall of the casing storage recess of the housing.

31. The device of claim 28, further comprising a lid shaped to cover the casing and be attached to the housing.

32. The device of claim 28, wherein the contact of the male connector moves relative to the housing and the connector block of the male connector while maintaining an electrical connection with the contact of the female connector and the circuit board supported by the housing.

33. The device of claim 28, wherein the male connector protrudes away from the housing along a direction substantially perpendicular to a longitudinal direction of the housing, and the contact of the male connector moves along a direction substantially parallel to the longitudinal direction of the housing.

34. The device of claim 33, wherein a central axis of the groove portion defined by the female connector extends along a direction substantially perpendicular to a longitudinal direction of the casing.

35. The device of claim 28, wherein the male connector protrudes away from the housing along a direction substantially parallel to a longitudinal direction of the housing, and the contact of the male connector moves along a direction substantially perpendicular to the longitudinal direction of the housing.

36. The device of claim 35, wherein a central axis of the groove portion defined by the female connector extends along a direction substantially parallel to a longitudinal direction of the casing.

37. The device of claim 28, wherein the contact of the male connector comprises a cantilever member configured to move relative to a pivot point on the connector block of the male connector.

38. The device of claim 28, wherein the connector block of the female connector defines a first wall of the groove portion, and the contact of the female connector defines a second wall of the groove portion.

39. A battery pack, for use in a radio communication equipment enclosed in a housing, mounted in a battery compartment comparted by attaching a lid to the housing, the battery pack being enclosed in a casing and having a longitudinal portion and a lateral portion, the housing including a first connector block having a projection, the projection projecting in a first direction such that the battery pack is mounted in the compartment, the first connector block having a first contact with elasticity along a second direction intersecting the first direction, the battery pack comprising:

a second connector block having a groove portion provided at the lateral portion in the casing of the battery pack without projecting from the casing, the second connector block having a second contact; and wherein, when the battery pack is mounted in the battery compartment, the first connector block mates with the second connector block, and the elasticity of the first contact biases the first contact against the second contact.

40. A connector for electrically connecting a radio communication apparatus with a battery pack for use in a radio communication equipment enclosed in a housing, the battery pack being mounted in a battery compartment comparted by attaching a lid to the housing, the battery pack being enclosed in a casing of the battery pack, the battery pack having a longitudinal portion and a lateral portion, the connector comprising:

a female connector portion including a first connector block having a groove portion provided on the lateral portion in the casing of the battery pack without projecting from the casing, the female connector block having a first contact;

a male connector portion including a second connector block having a projection provided on the housing, the projection projecting along a first direction such that the battery pack is mounted in the compartment, the male connector portion having a second contact having elasticity along a second direction substantially perpendicular to the first direction; and wherein, when the battery pack is mounted in the housing, the second connector block mates with the first connector block, and the second contact contacts the first contact based on the elasticity of the second contact.

41. The connector of claim 40, wherein the second direction is substantially parallel to a longitudinal direction of the longitudinal portion of the battery pack.

42. The connector of claim 40, wherein the male connector is arranged to contact an inner wall of the groove portion of the first connector block of the female connector when the second connector block mates with the first connector block.

43. The connector of claim 40, wherein the male connector includes a rectangular portion and the groove portion of the first connector block of the female connector is rectangular.

44. A radio communication equipment comprising:
   a housing shaped to enclose the radio communication equipment and define a battery compartment;
   a battery pack enclosed in a casing and including a longitudinal portion and a lateral portion, the battery pack being configured to be mounted in the battery compartment comparted by attaching a lid to the housing;
   a first connector block including a groove portion provided at the lateral portion in the casing of the battery pack without projecting from the casing, and a first contact;
   a second connector block including a projection supported by the housing so as to project along a first direction such that the battery pack is mounted in the battery compartment of the housing, the second connector block mating with the first connector block, and a second contact having elasticity along a second direction substantially perpendicular to the first direction, the second contact being in contact with the first contact when the second connector block mates with the first connector block.

45. The equipment of claim 44, wherein the second direction is substantially parallel to a longitudinal direction of the longitudinal portion of the battery pack.

46. The radio communication equipment of claim 44, wherein the projection of the second connector block substantially encloses the second contact of the second connector block.

47. The radio communication equipment of claim 44, wherein the projection of the second connector block is arranged to contact an inner wall of the groove portion of the first connector block when the second connector block mates with the first connector block.

48. The radio communication equipment of claim 44, wherein the projection of the second connector block is substantially rectangular and the groove portion of the first connector block is substantially rectangular.

49. A battery powered equipment comprising:
   a housing shaped to define a battery compartment;
   a battery pack enclosed in a casing and including a longitudinal portion and a lateral portion, the battery pack being configured to be mounted in the battery compartment comparted by attaching a lid to the housing;
   a first connector block including a groove portion provided at the lateral portion in the casing of the battery pack and including a first contact; and
   a second connector block including a projection supported by the housing so as to project along a first direction such that the battery pack is mounted in the battery compartment of the housing, the second connector block mating with the first connector block, and the second connector block including a second contact having elasticity along a second direction, the second contact being in contact with the first contact when the second connector block mates with the first connector block.

50. A battery powered equipment comprising:
   a housing shaped to define a battery compartment;
   a battery pack enclosed in a casing and including a longitudinal portion and a lateral portion, the battery pack being configured to be mounted in the battery compartment comparted by attaching a lid to the housing;
   a first connector block including a groove portion provided at the lateral portion in the casing of the battery pack and including a first contact;
   a second connector block including a projection supported by the housing so as to project along a first direction such that the battery pack is mounted in the battery compartment of the housing, the second connector block mating with the first connector block, and the second direction and being in contact with the first contact when the second connector block mates with the first connector block.

51. A battery pack for use in a battery powered equipment enclosed in a housing, mounted in a battery compartment comparted by attaching a lid to the housing, and having a longitudinal portion and a lateral portion, the housing including a first connector block having a projection, the projection projecting in a first direction such that the battery pack is mounted in the compartment, the first connector block having a first contact with elasticity along a second direction, the battery pack comprising:
   a second connector block including a groove portion provided at the lateral portion in the casing of the battery pack, and the second connector block having a second contact; and
   wherein when the battery pack is mounted in the battery pack compartment, the first connector block mates with the second connector block, and the elasticity of the first contact biases the first contact against the second contact.

52. A battery pack for use in a battery powered equipment enclosed in a housing, mounted in a battery compartment comparted by attaching a lid to the housing, and having a longitudinal portion and a lateral portion, the housing including a first connector block having a projection, the projection projecting in a first direction such that the battery pack is mounted in the compartment, the first connector block having a first contact, the battery pack comprising:
   a second connector block including a groove portion provided at the lateral portion in the casing of the battery pack, and the second connector block having a second contact; and
   wherein when the battery pack is mounted in the battery pack compartment, the first connector block mates with the second connector block, and the first contact is biased along the second direction and is in contact with the second contact.

53. A connector for electrically connecting an electrical component with a battery pack for use in a battery powered equipment in a housing, the battery pack being mounted in a battery compartment comparted by attaching a lid to the housing, the battery pack being enclosed in a casing of the battery pack, the battery pack having a longitudinal portion and a lateral portion, the connector comprising:
   a female connector portion including a first connector block having a groove portion provided on the lateral portion in the casing of the battery pack, the female connector block having a first contact;
   a male portion including a second connecter block having a projection provided on the housing, the projection projecting along a first direction such that the battery pack is mounted in the compartment, the male connector portion having a second contact having elasticity along a second direction; and wherein, when the battery pack is mounted in the housing, the second connector block mates with the first connector block, and the second contact contacts the first contact based on the elasticity of the second contact.

54. A connector for electrically connecting an electrical component with a battery pack for use in a battery powered equipment enclosed in a housing, the battery pack being mounted in a battery compartment comparted by attaching a lid to the housing, the battery pack being enclosed in a casing of the battery pack, the battery pack having a longitudinal portion and a lateral portion, the connector comprising:

a female connector portion including a first connector block having a groove portion provided on the lateral portion in the casing of the battery pack, the female connector block having a first contact;

a male portion including a second connector block having a projection provided on the housing, the projection projecting along a first direction such that the battery pack is mounted in the compartment, the male connector portion having a second contact to be biased along a second direction; and wherein, when the battery pack is mounted in the housing, the second connector block mates with the first connector block, and the second contact is biased to the first contact along the second direction and contacts the first contact.

* * * * *